(No Model.)
G. B. GABLE.
COMBINATION TOOL.
No. 304,520. Patented Sept. 2, 1884.
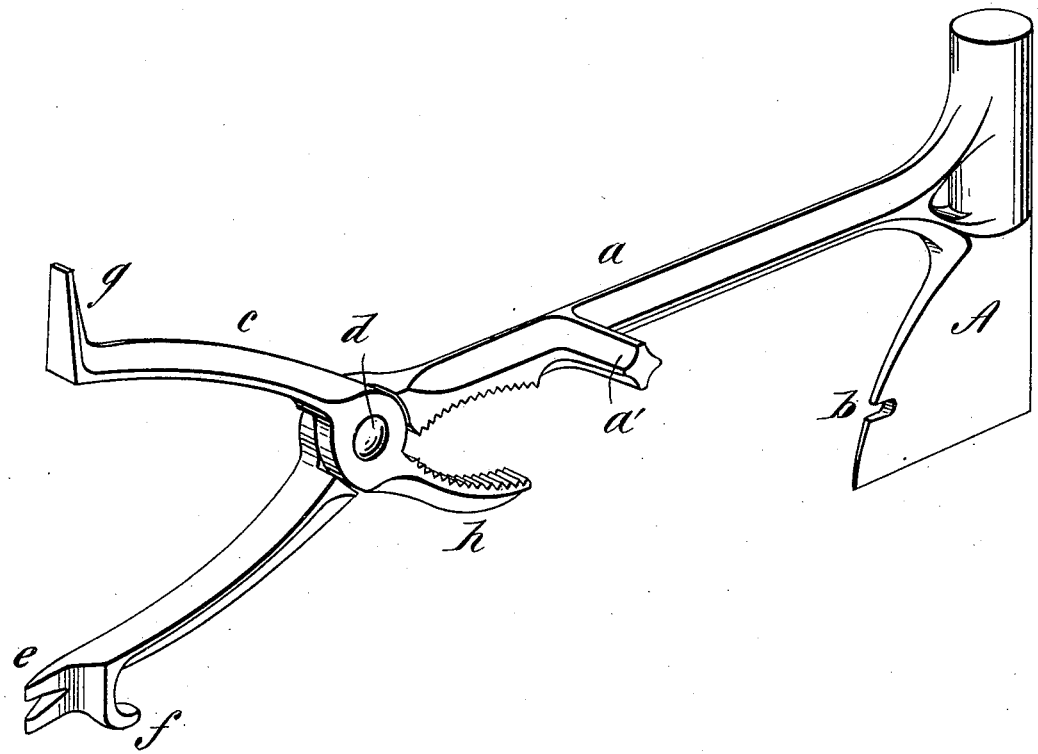
WITNESSES:
Donn Twitchell
C. Sedgwick
INVENTOR:
G. B. Gable
BY Munn & Co
ATTORNEYS.

UNITED STATES PATENT OFFICE.

GEORGE B. GABLE, OF OMAHA, NEBRASKA.

COMBINATION-TOOL.

SPECIFICATION forming part of Letters Patent No. 304,520, dated September 2, 1884.

Application filed June 30, 1884. (No model.)

*To all whom it may concern:*

Be it known that I, GEORGE B. GABLE, of Omaha, in the county of Douglas and State of Nebraska, have invented a new and Improved Combination-Tool, of which the following is a full, clear, and exact description.

The object of my invention is to furnish a combination or universal tool for household use; and it consists in the combined features of construction hereinafter described and claimed.

Reference is to be had to the accompanying drawing, forming a part of this specification, wherein my improved tool is shown by a side perspective view.

A is a hatchet having a malleable-iron handle, $a$, and made with a notch at $b$ for drawing nails. The outer end of handle $a$ is curved to one side, and an arm, $c$, of corresponding shape is pivoted to the handle at $d$, so as to form a boot-jack and box-holder. $a'$ is the fulcrum-stud on the handle for the boot-jack. The extreme end, $e$, of the handle is of flat form for use as a stove-lifter, notched to serve also as a tack-puller, and at $f$ is a hook for lifting pots. On the outer end of arm $c$ is a straight hook, $g$, for use in regulating stove-doors, and a screw-driver, and the arm has a tail-piece, $h$, roughened for use in connection with handle $a$ as a nut-cracker or as a wrench.

The combination-tool thus constructed is inexpensive. It can be used for twelve distinct purposes, most of which are generally performed by separate tools.

Having thus described my invention, I claim as new and desire to secure by Letters Patent—

1. The combination, with hatchet-handle $a$, having a curved end, of the pivoted arm $c$, formed for use in the manner and for the purpose specified.

2. The hatchet-handle $a$, having flat end $e$ and hook $f$, as and for the purposes specified.

3. The combination, with hatchet-handle $a$, of pivoted arm $c$, formed with a tail portion, $h$, as and for the purpose specified.

GEORGE B. GABLE.

Witnesses:
WM. A. REDICK,
J. C. DREXEL.